United States Patent [19]
Grant et al.

[11] Patent Number: 5,548,590
[45] Date of Patent: Aug. 20, 1996

[54] HIGH PERFORMANCE FRAME TIME MONITORING SYSTEM AND METHOD FOR A FIBER OPTIC SWITCH FOR A FIBER OPTIC NETWORK

[75] Inventors: Robert H. Grant, Toronto; David Book, Thornhill; Gregory T. Sullivan, Brampton, all of Canada

[73] Assignee: Hewlett-Packard Company, Palo Alto, Calif.

[21] Appl. No.: 380,766

[22] Filed: Jan. 30, 1995

[51] Int. Cl.⁶ .................................................. H04L 12/56
[52] U.S. Cl. ............................................................... 370/61
[58] Field of Search .................................... 370/13, 17, 60, 370/60.1, 58.1–58.3, 94.1, 61

[56] References Cited

U.S. PATENT DOCUMENTS

| | | | |
|---|---|---|---|
| 4,569,042 | 2/1986 | Larson | 370/13 |
| 4,894,823 | 1/1990 | Adelmann et al. | 370/94.2 |
| 5,402,417 | 3/1995 | Aramaki | 370/60 |
| 5,402,426 | 3/1995 | Foglar et al. | 370/60 |
| 5,418,779 | 5/1995 | Yemini et al. | 370/54 |

*Primary Examiner*—Douglas W. Olms
*Assistant Examiner*—Ajit Patel
*Attorney, Agent, or Firm*—Richard F. Schuette

[57] ABSTRACT

A frame time monitoring system tracks the time in which data frames reside within a fiber optic switch for a fiber optic network. The network switch transfers data frames from source ports to destination ports. The frame time monitoring system comprises a digital signal processor (DSP), which is configured by a software program to implement a plurality of timers relative to frames to be routed through the switch from a source port to a destination port. The processor operates as an incrementer and is configured to output a series of sequential timer states corresponding to each particular frame. The timer states are generally indicative of the amount of time in which the frame has resided in the switch. A logic network of logic gates is connected to the processor to receive and interpret the timer states. The logic network has frame busy (FBSY) and delete mechanisms for determining elapse of respective FBSY and delete time periods based upon the timer states. The FBSY and delete mechanisms generate respective FBSY and delete signals after the elapse of the periods, which can vary for optimization reasons depending upon frame class and type. Thus, in the foregoing configuration, a processor is utilized as a timing incrementer and logical decisions are allocated to the logic network, resulting in an optimum balance between hardware and software so as to minimize cost, space requirements, and complexity, and maximize frame tracking resolution.

16 Claims, 12 Drawing Sheets

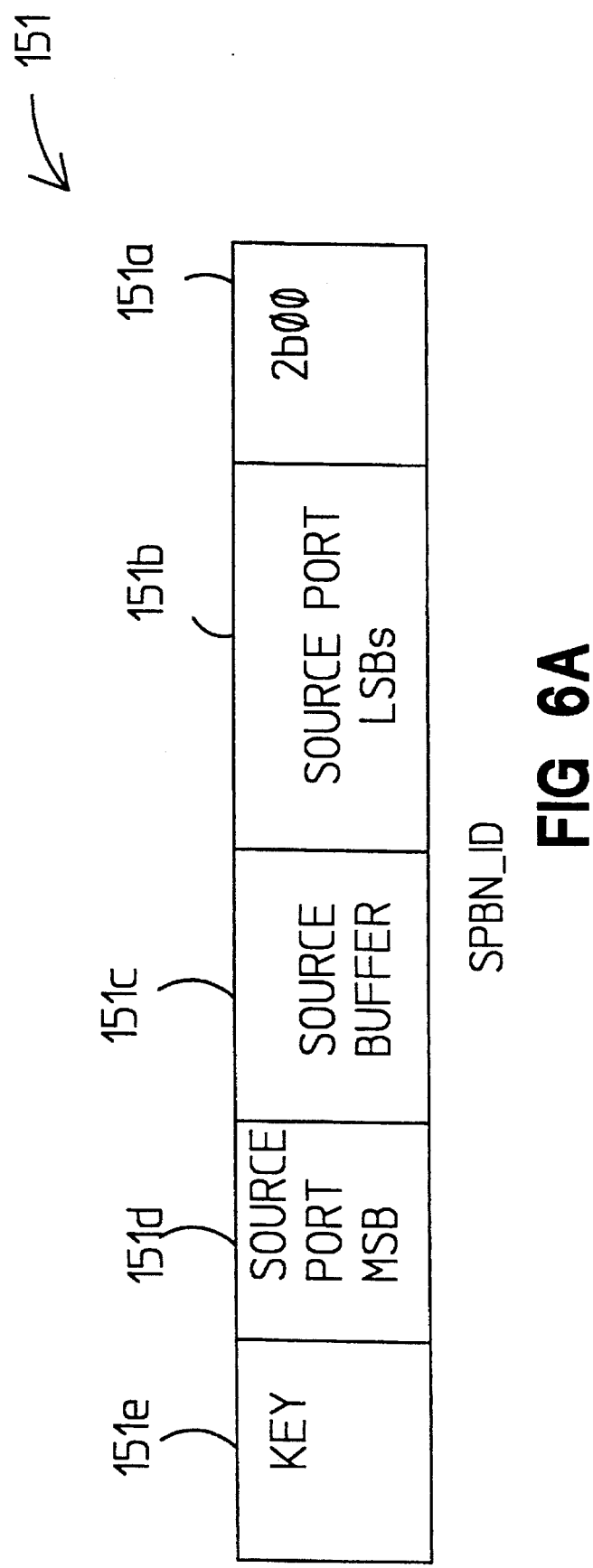

HIGH PERFORMANCE FRAME TIME MONITORING SYSTEM AND METHOD FOR A FIBER OPTIC SWITCH FOR A FIBER OPTIC NETWORK

FIELD OF THE INVENTION

The present invention generally relates to data communications and fiber optic networks, and more particularly, to a frame time monitoring system and method for tracking the time in which data frames reside within a fiber optic switch for a fiber optic network, while minimizing cost, space requirements, and complexity, and maximizing frame tracking resolution (i.e., timer update frequency).

BACKGROUND OF THE INVENTION

A data communications network generally includes a group of interconnected communication channels which provides intercommunication among a combination of elements or devices, for instance, computers, peripherals, etc. Historically, networks have been constructed by utilizing communication channels formed from coaxial cables and/or twisted pair cable configurations and interconnected via a suitable interface, or switching module.

Fiber optic cables are increasingly being used in the network industry, instead of coaxial cables and twisted pairs, because of their much broader bandwidth, better propagation properties, and other optimal transmission characteristics. Recently, the Fibre Channel protocol was developed and adopted as the American National Standard For Information Systems (ANSI). The Fibre Channel industry standard is described in detail in, for example, *Fibre Channel Physical And Signalling Interface*, Rev. 4.2, American National Standard For Information Systems (ANSI) (1993). The Fibre Channel industry standard provides for much higher performance and greater flexibility than previous industry standards by allowing for variable-length data frames, or packets, to be communicated through fiber optic networks which comply with the standard.

A variable-length frame 11 is illustrated in FIG. 1. The variable-length frame 11 comprises a 4-byte start-of-frame (SOF) indicator 12, which is a particular binary sequence indicative of the beginning of the frame 11. The SOP indicator 12 is followed by a 24-byte header 14, which generally specifies, among other things, the frame source address and the destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection and/or correction, and by a 4 byte end-of-frame (EOF) indicator 18. The frame 11 of FIG. 1 is much more flexible than a fixed frame and provides for higher performance by accommodating the specific needs of specific applications.

The Fibre Channel industry standard also provides for several different types of data transfers and data frames. For example, a class 1 transfer requires circuit switching, i.e., a reserved data path through the network switch, and generally involves the transfer of more than one data frame, oftentimes numerous data frames, between the network elements. To set up a class 1 transfer, a start-of-frame class 1 (SOFc1) frame, which is typically a small data packet, is initially passed through the switch, and then after the set up, longer data frames are passed through the switch. As another example, a class 2 transfer involves allocation of an independent path through the network switch for each transfer of a single frame from one network element to another. In a class 2 transfer, a receipt acknowledgement frame is sent from the destination port after receipt of the data frame. As still another example, a class 3 transfer is similar to a class 2 transfer, except that the class 3 transfer does not require a receipt acknowledgement frame from a destination port as in the case of a class 2 transfer.

To date, fiber optic switches for implementing networks in accordance with the Fibre Channel industry standard are in a state of infancy. A need exists in the industry for new and improved systems for implementing the Fibre Channel industry standard for fiber optic networks with much higher performance than presently existing systems. Specifically, there is a significant need for a frame time monitoring system for monitoring the time in which a data frame resides within a fiber optic switch. This timing information is important for optimizing performance because it indicates the inability of the switch to successfully communicate the frame to the desired destination port and can be used to flag or instigate remedial action, such as deletion of the respective frame in the switch or return of the frame to its corresponding source port. To make the problem even more difficult and perplexing, the frame time monitoring system must be able to keep track of numerous data frames simultaneously, typically hundreds at an instance in time, and must be able to update timing clocks associated with the frames within hundreds of microseconds ($\mu$s) to effectuate acceptable performance. Furthermore, space requirements and complexity in design are other primary considerations.

It is possible that the frame time monitoring system could be implemented in software, which would be run by a conventional processor. However, such a solution would require a lengthy program due to the vast number of timers and logical comparison decisions and would therefore be undesirably slow and the timers would exhibit less than desirable resolution. Moreover, the frame time monitoring system could be implemented with a logic network made up of logic gates. Although this hardware implementation would undoubtedly be faster than the software implementation, the logic network would require numerous gates resulting in unacceptable cost and would require an undesirable amount of space. Finally, both the aforementioned hypothetical software and hardware implementations would be undesirably complex in design.

SUMMARY OF THE INVENTION

An object of the present invention is to overcome the deficiencies and inadequacies of the prior art as noted above and as generally known in the industry.

Another object of the present invention is to provide a high performance frame time monitoring system and method for a fiber optic switch.

Another object of the present invention is to provide a frame time monitoring system and method for a fiber optic switch which provide for high resolution time monitoring.

Another object of the present invention is to provide a frame time monitoring system and method which can track timing relative to numerous frames.

Another object of the present invention is to provide a frame time monitoring system which is inexpensive.

Another object of the present invention is to provide a frame time monitoring system which is simple in design, which is efficient and reliable in operation, and which can be implemented in little space.

Briefly described, the frame time monitoring system of the present invention tracks with high performance the time in which data frames reside within a fiber optic switch for a fiber optic network. The network switch transfers data frames from source ports to destination ports. The frame time monitoring system generally comprises a time processor, preferably a digital signal processor, which is configured by software to implement a plurality of timers relative to incoming frames which are to be routed through the switch from a source port to a destination port. The time processor operates as an incrementer and is configured to output a series of sequential timer states corresponding to each particular frame. The timer states are generally indicative of the amount of time in which the frame has resided in the switch.

A time logic network of logic gates, which functions much faster than the time processor, is connected to the time processor to receive and interpret the sequential timer states. The time logic network has a delete mechanism for determining elapse of a predetermined delete time period based upon the timer states. The delete mechanism generates a delete signal after the elapse of the predetermined delete time period. Thus, in the foregoing configuration, a processor is utilized as merely a timing incrementer and logical decisions are allocated to the logic network which is much faster than the processor. This configuration strikes an optimum balance between hardware and software so as to minimize cost, space requirements, and complexity, and to maximize frame tracking resolution (i.e., timer update frequency).

Furthermore, the time logic network may be equipped with a frame return determination mechanism for determining when a frame is returnable and nonreturnable to a source port. Moreover, when the frame is returnable, a frame busy (FBSY) mechanism determines elapse of a predetermined frame busy time period based upon the timer states. The PBSY mechanism generates an FBSY signal after the lapse of the FBSY time period. This FBSY signal triggers a sequence of events for returning the corresponding frame to its source port.

Preferably, the delete time period and the busy time period are set for each frame to values which depend upon the particular class and type of frame in order to further optimize performance of the fiber optic switch. In other words, link control frames (e.g., acknowledge signals, reject signals, etc.) can be accorded longer delete and busy time periods than nonlink control frames (actual data) because accommodation of the link control frames effectively frees up the switch and enhances throughput.

To further optimize the system, the timer states can define respective memory addresses for values for loading the timer.

In addition to achieving all of the aforementioned objects, the present invention has numerous other advantages, a few of which are delineated hereafter.

An advantage of the present invention is that various types of data frames can be accommodated. Specifically, frames which have a returnable frame are accorded an FBSY time period and can be returned. Furthermore, frame transfers which have nonreturnable frames are only accorded a delete time period and are not returned. Finally, the values for the delete and FBSY time periods can be varied, depending upon the particular types of frames (e.g. SOFc1, class 2 nonlink control, class 2 link control, class 2 busy and reject, class 3, etc.).

Another advantage of the present invention is that because the processor is used solely as an incrementer, an inexpensive processor, particularly a digital signal processor (DSP), can be utilized, while high resolution timing for numerous frames is still achieved.

Another advantage of the present invention is that the allocation of hardware and software resources optimizes performance, space requirements, and complexity.

Another advantage of the present invention is that the design enables decrementing, or updating, of timers at least every 600 microseconds.

Other objects, features, and advantages of the present invention will become apparent to one of skill in the art upon examination of the following drawings and detailed description. All such additional objects, features, and advantages are intended to be included herein within the scope of the present invention.

BRIEF DESCRIPTION OF THE DRAWINGS

The present invention can be better understood with reference to the following drawings.

FIGS. 6A through 6C show data structures of information transferred to and from the frame time monitoring system of FIG. 5;

FIG. 6A is a data structure for a source port and buffer identification SPBN_ID);

FIG. 6B is a data structure for timer state identification (TMS_ID);

FIG. 6C is a data structure for a frame forwarding identification (FWD_ID);

DETAILED DESCRIPTION OF THE PREFERRED EMBODIMENT

Figure 2:
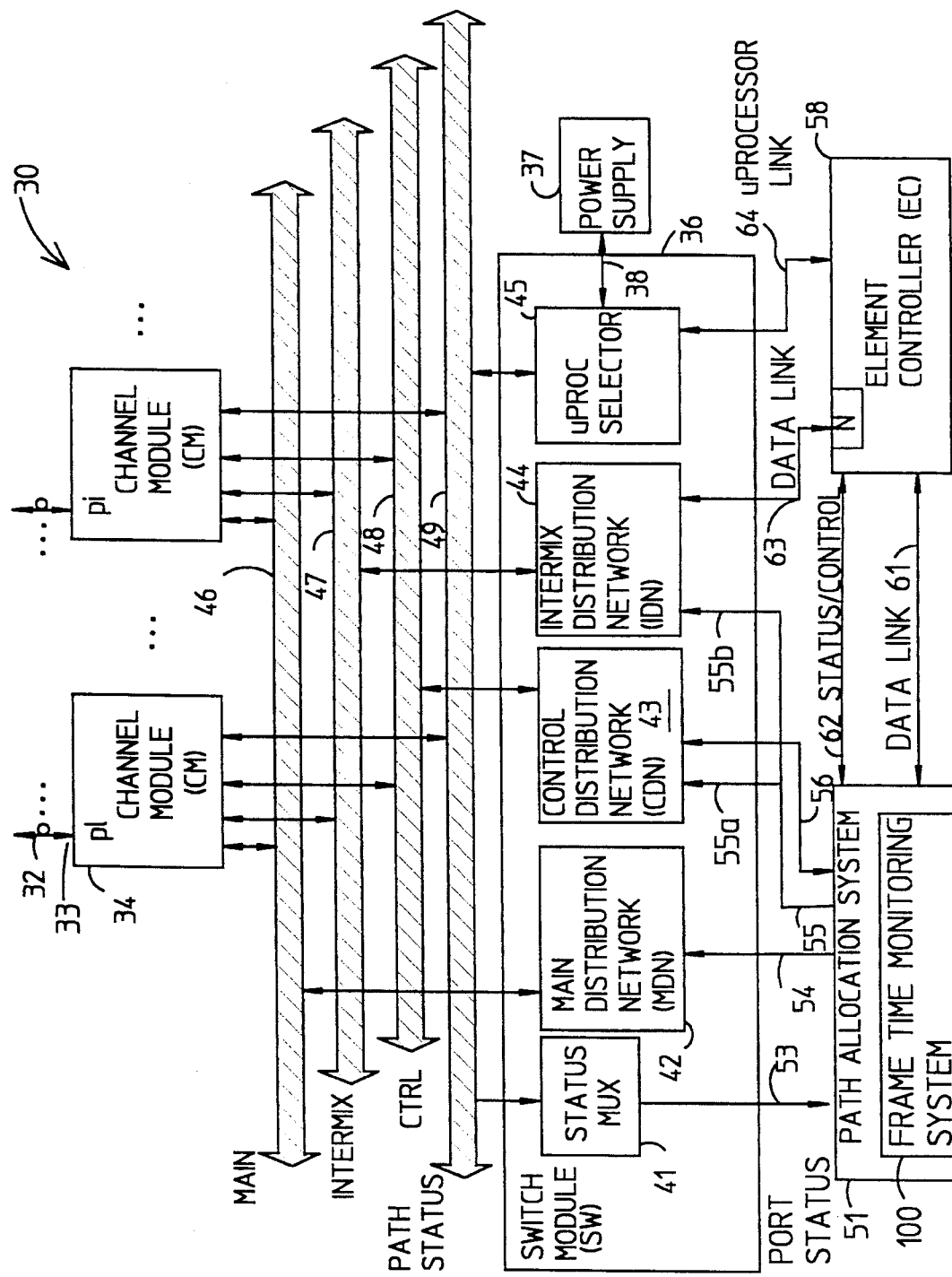
FIG. 2 is a schematic circuit diagram of a fiber optic switch for a fiber optic network in accordance with the present invention.

With reference now to the drawings wherein like reference numerals designate corresponding parts throughout the several views, a schematic circuit diagram of a fiber optic switch 30 is shown in FIG. 2. The fiber optic switch 30 enables implementation of a fiber optic network by permitting selective interconnection of a plurality of fiber optic channels 32. The fiber optic switch 30 is a very flexible system, permits both circuit and frame switching in accordance with the Fibre Channel industry standard and is a much higher performance system than other conventional fiber optic switches.

I. Fiber Optic Switch

The fiber optic switch 30 has a plurality of channel modules 34 to which the fiber optic channels 32 are connected via respective ports (p1–pi; sometimes called fabric ports, or F-ports) 33. Each channel module 34 is connected to one or more of the fiber optic channels 32. Each channel module 34 provides port intelligence for data communication with the channels, as well as bypasses for class 1 data transfers and receive memory for temporarily storing data frames for class 2 and class 3 data transfers, as will be further described in detail later in this document. The channel modules 34 are connected to a switch module 36, which receives and distributes electrical energy from a power supply 37. In the preferred embodiment, the switch module 36 is implemented as part of a back plane and has disposed thereon a number of functional interface elements.

The switch module 36 has a status multiplexer (MUX) 41 which is configured to receive status signals from the channel modules 34 concerning the ports 33 and associated circuitry. The status signals include at least the following: a "new frame arrived" signal, which indicates when a new frame has been received by a receive memory 84 (FIG. 3) associated with the channel module 34; a receiver ready, or "rxready" signal, which indicates when data received from a port 33 is ready and not ready to be sent through the switch 30 from the receive memory 84 (FIG. 3); an "intermix bus ready" signal, which indicates when the IDN 44 is ready (not being used) and not ready (currently being used) to transfer data; a "port active" signal, which indicates when a port intelligence mechanism 73 (FIG. 3) associated with a port 33 is active/inactive; a "transmitter ready" signal, which indicates when a transmit memory 86 (FIG. 3) associated with a port 33 is ready and not ready to receive data (destined for a destination port 33) from the switch 30; an "intermix ready" signal, which indicates when the IDN 44 is ready and not ready to perform an intermix transfer; and a "transfer status ready," or "xfer ready," signal, which indicates when status information is ready and not ready to be transferred to the path allocation system 51 from the associated status/control logic 85 (FIG. 3) of a channel module 34.

Referring again to FIG. 2, a main distribution network (MDN) 42 selectively interconnects the data paths of the channels 32. An MND control bus 54 controls the MDN 42. A control distribution network (CDN) 43 communicates control signals to the various channel modules 34. An intermix distribution network (IDN) 44 selectively interconnects intermix oaths between channel modules 34. Intermix paths are a set of alternate data paths which are separate from those data paths associated with the MDN 42 and which can permit data flow between selected channels 32 while data paths of the MDN 42 are in use. Finally, a processor selector 45 can optionally be provided as part of an auxiliary system for interconnecting processors and controllers distributed throughout the fiber optic switch 30.

A path allocation system 51 is connected to the switch module 36 and, particularly, to the status multiplexer 41, the MDN 42, the CDN 43, and the IDN 44. The path allocation system 51 generally allocates data interconnect paths through the switch module 36 and between fiber optic ports 33 and determines the priority of the connections. Significantly, the path allocation system 51 includes a frame time monitoring system 100 which, because of its novel design, results in very desirable performance attributes with minimum space requirements and minimized complexity, as will be further described in detail later in this document.

Also optionally connected to the switch module 36 is an element controller (EC) 58. The EC 58 essentially provides servers, for example, a name server, a time server, etc. for the interface system 30. The EC 58 has a data link 61 with the path allocation system 51 for communicating server information and a status/control connection 62 for exchanging status/control signals with the path allocation system 51. The EC 58 exchanges initialization and/or configuration information with the CMs 34 and the microprocessor selector 45 via respective connection 64. Further, the EC 58 provides an embedded port, as shown in FIG. 2, for accessing frames in the fabric via the IDN 44 and data connection 63.

II. Channel Module

Figure 3:
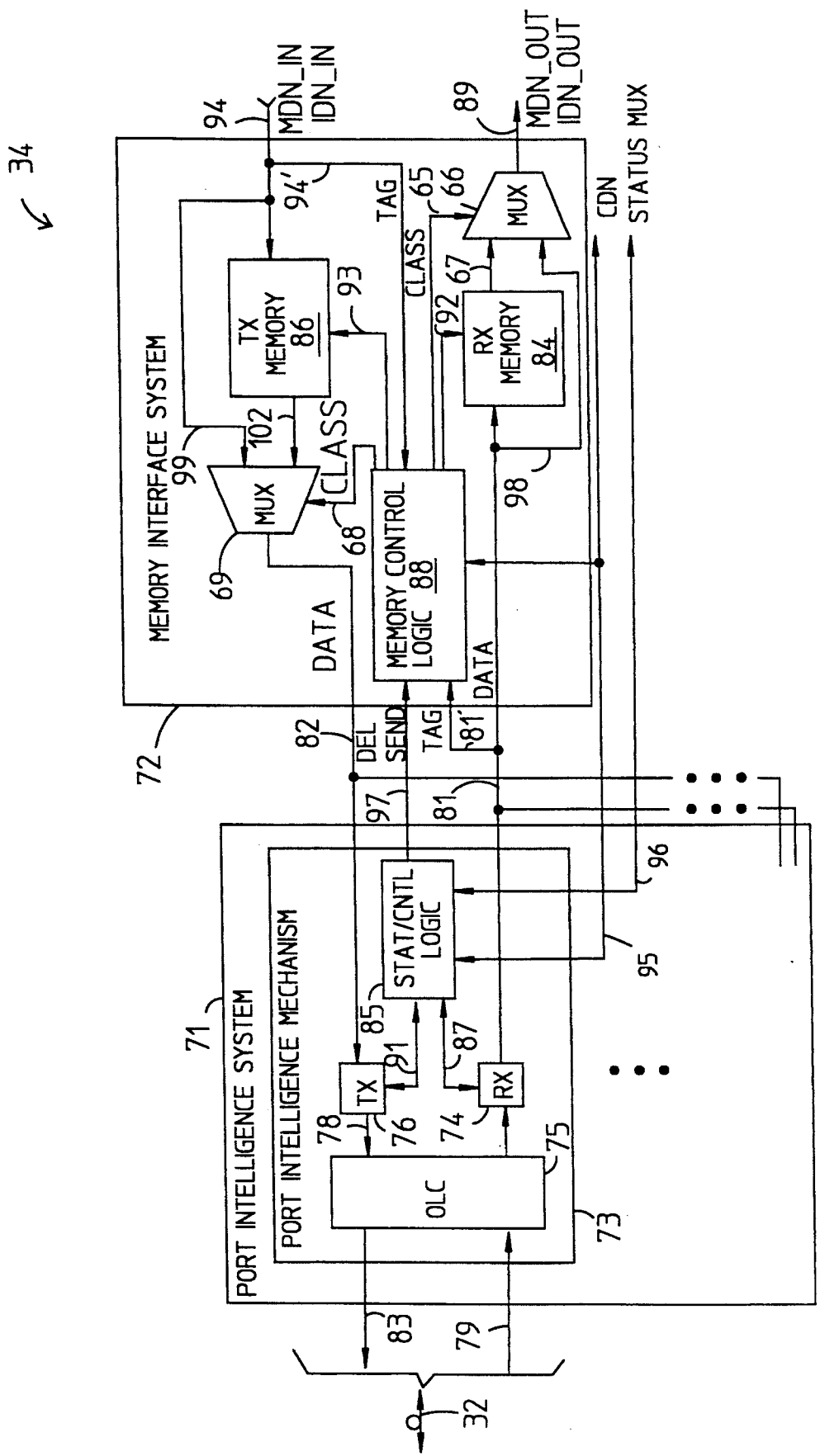
FIG. 3 is a schematic circuit diagram of a channel module (CM) within the fiber optic switch of FIG. 2.

Preferably, each of the channel modules 34 is constructed as indicated in the schematic circuit diagram of FIG. 3. With reference to FIG. 3, each channel module 34 comprises a port intelligence system 71 connected to a memory interface system 72. In the preferred embodiment, the port intelligence system 71 has one or more port intelligence mechanisms 73. One port intelligence mechanism 73 is allocated to each fiber optic channel 32. Each port intelligence mechanism 73 has a receiver (RX) 74, a transmitter (TX) 76, an optical link card (OLC) 75, and a status/control (STAT/CNTL) logic 85. The receiver 74 and the transmitter 76 are adapted to receive and transmit data, respectively, through their corresponding input and output fibers 79, 83 (shown collectively in FIG. 2 as channel 32) in accordance with the Fibre Channel industry standard protocol and an the channel's particular bit rate.

The OLC 75 is utilized to directly interface the port intelligence mechanism 73 to the fiber optic channel 32. The OLC 75 provides an optical-to-electrical conversion as well as a serial-to-parallel conversion between the input fiber 79 of the channel 32 and the receiver 74. Furthermore, the OLC 75 provides an electrical-to-optical conversion as well as a parallel-to-serial conversion between the output fiber 83 of the channel 32 and the transmitter 76. The OLC 75 can be any suitable conventional optical link card, for example but not limited to, a model OLC266 manufactured by and commercially available from IBM Corp., U.S.A., or a model MIM266 manufactured by and commercially available from ELDEC, Inc., U.S.A.

The status/control logic 85 monitors and controls both the receiver 74 and the transmitter 76, as indicated by corresponding bidirectional control connections 87, 91. Further, the status/control logic 85 exchanges control signals on control connection 95 with the CDN 43 (FIG. 2), provides status signals on connection 96 to the status MUX 41 (FIG. 2) indicative of, e.g., whether the corresponding port 33 is available or busy, and forwards control signals to the memory interface system 72 via connection 97. The status/control logic 85 further recognizes when a new frame is received by the receiver 74 and determines the transfer class (either 1 or 2) as well as the length of data pertaining to each new frame. It should be noted that a frame could have no data, as for example, in the case of an SOFc1 frame, which is initially passed through the switch 30 for setting the switch 30 up to reserve a bidirectional path for a class 1 data transfer.

The memory interface system 72 is connected in series, or cascaded, with the port intelligence system 71, and particularly, with each port intelligence mechanism 73 contained therein. The memory interface system 72 generally provides class 1 bypass data connections 98, 99 for class 1 data transfers and provides temporary storage for class 2 and 3 data transfers. For data storage relative to class 2 and 3 data transfers, the memory interface system 72 has a receive memory (RX MEMORY) 84 for source data, a transmit memory (TX MEMORY) 86 for destination data, and memory control logic 88 for controlling the receive and transmit memories 84, 86. The receive memory 84 and the transmit memory 86 may be partitioned into a number of individual buffers or memory blocks, if desired.

Figure 1:
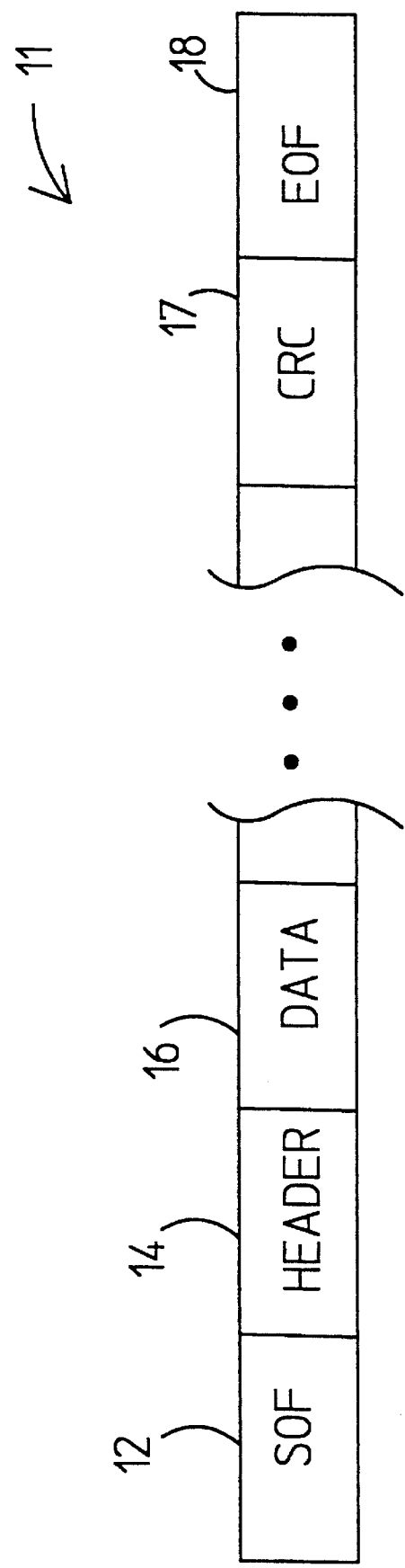
FIG. 1 is a schematic diagram of a variable-length frame communicated through a fiber optic switch of a fiber optic network in accordance with the Fibre Channel industry standard protocol.

When incoming class 1 source data is received by the memory interface system 72 from the port intelligence system 71, the source data bypasses the receive memory 84 via successively bypass data connection 98, MUX 66, and data connection 89. The data connection 89 introduces the source data to the data buses of the MDN 42 or the IDN 44 of the switch module 36. The memory control logic 88 receives a tag 81' from tile receiver 74 indicative of either a class 1 or class 2, 3 data transfer and controls the MUX 66 accordingly on class control connection 65. The receiver 74 generates the tag 81' based upon the header 14 (FIG. 1) on the incoming data. In the preferred embodiment, two-bit tags are used. A tag "00" indicates nonuse. A tag "01" indicates data. A tag "10" indicates either SOF or EOF for a class 1 data transfer. A tag "11" indicates either SOF or EOF for a class 2 or 3 data transfer.

When incoming class 2 or 3 source data is received by the memory interface system 72 (as well as an SOFc1 frame), as is determined by the memory control logic 88 via tag 81', the receive memory 84 reads and stores the source data from the receiver 74 via data connection 81 under the control of the memory control logic 88. Moreover, when the timing is appropriate, the receive memory 84 writes data to the data buses of the MDN 42 or the IDN 44 of the switch module 36 via data connection 67, MUX 66, and data connection 89 under the control of the control logic 88. In order to transfer data from the receive memory 84 to the data buses, the CDN 43 (FIG. 2) communicates a send control signal 95 to the status/control logic 85, and the status/control logic 85 in turn forwards a send signal via control connection 97 to the memory control logic 88. The send signal from the status/control logic 85 designates the length of the data frame to be sent. Based upon the send signal, the memory control logic 88 controls the receive memory 84 via control connection 92 and controls the MUX 66 with class control connection 65 so that the MUX 66 communicates data from the receive memory 84 to the data connection 89. If desired, the CDN 43 can also delete frames within the receive memory 84 by sending a delete signal (del) to the status/control logic 85, which in turn forwards the delete command to the memory control logic 88 via control connection 97.

Destination data intended for a destination port 33 from the data buses of the MDN 42 or the IDN 44 is made available to the transmit memory 86, as indicated by data connection 94, and the MUX 69, as indicated by the bypass data connection 99. A two-bit tag on tag connection 94', similar to the two-bit nag on tag connection 81', informs the memory control logic 88 when the destination data corresponds to either a class 1 data transfer or a class 2, 3 data transfer. When class 1 destination data is received, the memory control logic 88 controls the MUX 69 via control connection 68 so that the MUX 69 channels the destination data directly to the transmitter 76 of the appropriate port intelligence mechanism 73 via data connection 82, thereby effectively bypassing the transmit memory 86. In contrast, when class 2, 3 destination data is received by the memory interface system 72, the memory control logic 88 controls the transmit memory 86 to store the incoming destination data via data connection 94. When timing is appropriate, the destination data is then ultimately forwarded to the transmitter 76 of the appropriate port intelligence mechanism 73 via successively data connection 102, MUX 69, and data connection 82, under the control of the memory control logic 88.

III. Path Allocation System

Figure 4:
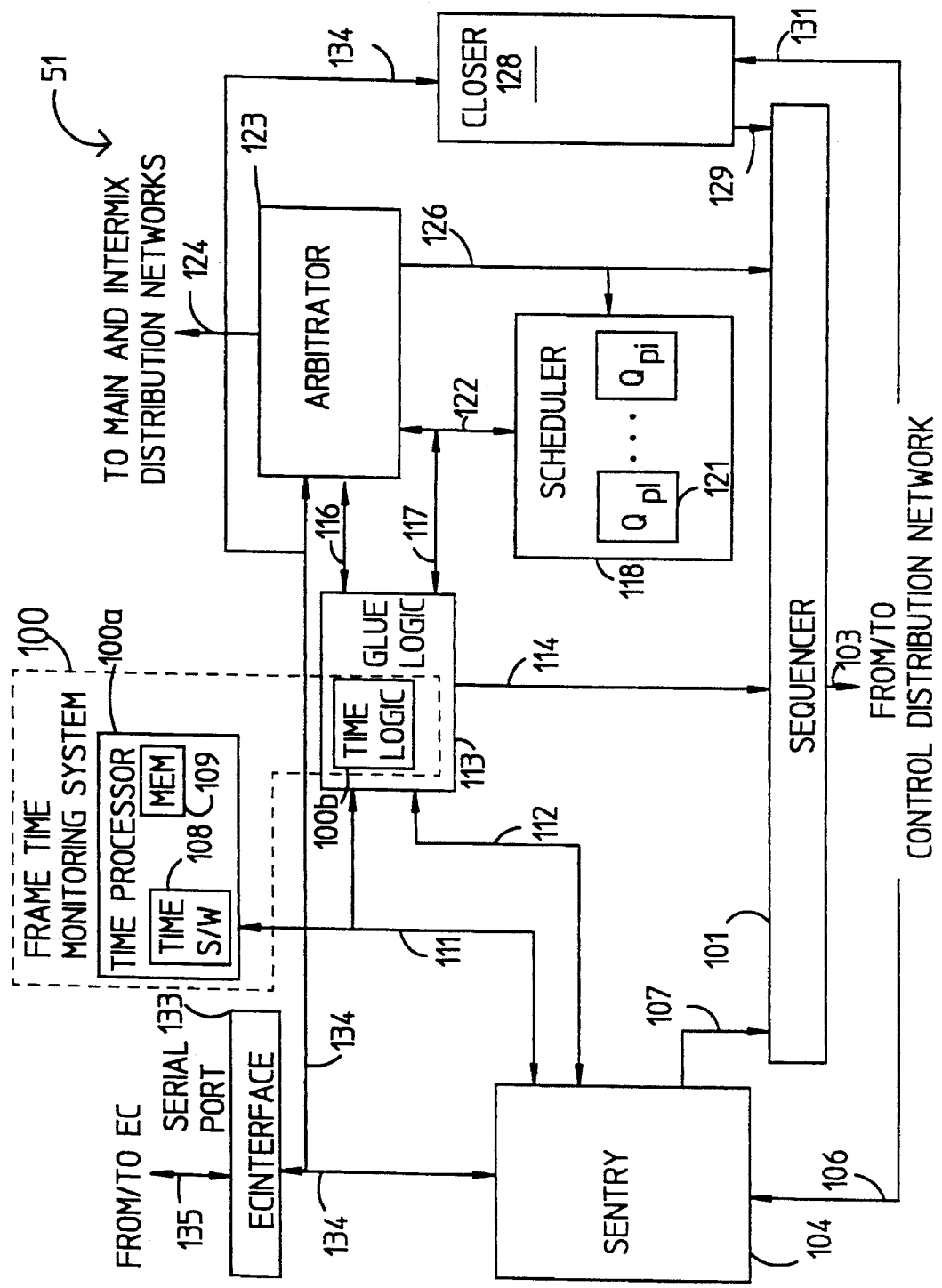
FIG. 4 is a schematic circuit diagram of a path allocation system within the fiber optic switch of FIG. 2.

A preferred embodiment of the path allocation system 51 of FIG. 2 is illustrated in detail in FIG. 4. As mentioned, the path allocation system 51 allocates the data paths through the switch module 36. In architecture, the preferred embodiment of the path allocation system 51 has the following elements, as is illustrated in FIG. 4. A sequencer 101 is connected to the CDN 43 via a control connection 103. A sentry 104 communicates to the CDN 43 via the control connection 106 and is connected to the sequencer 101 via the control connection 107. The glue logic 113 communicates control signals with the sentry 104 via the control connection 112, and communicates control signals to the sequencer 101 via the control connection 114. The novel frame time monitoring system 100 is constructed from a separate time processor 100a and a time logic network 100b, which is situated within the glue logic 113 in the preferred embodiment. The frame time monitoring system 100 communicates to the sentry 104 and glue logic 113 via a control connection 111. The scheduler 118 maintains a plurality of destination queues $(Q_{p1}-Q_{pi})$ 121 which correspond respectively with each of the ports (p1–pi) 33. The scheduler 118 communicates with the glue logic 113 via connections 117, 122. An arbitrator 123 is connected to the scheduler 118 via the connection 122, is connected to the glue logic 113 via the connection 116, is connected to the sequencer 101 via the connection 126, and communicates to the NDN 42 and IDN 44 via the data connection 124. A closer 128 monitors the sequencer 101 via the connection 129, receives control signals from the CDN 43 via the control connection 131, and communicates to the sentry 104, the arbitrator 123, and an element controller (EC) interface 133 via the connection 134. The EC interface 133 communicates via a serial connection 135 with the element controller 58 (FIG. 2).

A. Status Mux

In addition to the control and data connections described in the previous paragraph, the status MUX 41 of FIG. 2 is connected to and communicates status signals to the sentry 104, the glue logic 113, the arbitrator 123, and the closer 128. However, the foregoing connections are not shown in FIG. 4 for simplicity.

B. Sequencer

The sequencer 101 can be implemented with any suitable logic, for example, as a state machine(s) in a conventional field programmable gate array (FPGA) with the functionality as set forth hereafter. The sequencer 101 serves as the primary interface to the CDN 43 via the control connection 103. It essentially arbitrates the CDN 43 among the sentry 104, the arbitrator 123, and the closer 128.

C. Sentry

The sentry 104 can be constructed with any suitable logic, for example, as a state machine(s) in an FPGA. It monitors the new frame status ("new frame arrived" signal) of the ports 33 via the status MUX 41 (FIG. 2) and status/control logic 85 (FIG. 3) and determines when a new frame is available for routing through the MDN 42 of the switch module 36. In essence, the sentry 104 collects data of validated, buffered frames, maps the destination port identification (DID) from the header (FIG. 1) of an incoming frame to an appropriate port 33 via a routing table(s), determines the appropriateness of a new frame for a destination port 33 (i.e., whether the frame can be intermixed onto a class 1 stream), and determines whether a new frame is proper or in error.

The sentry 104 and frame time monitoring system 100, together, further provide queue command information to the scheduler 118, via the glue logic 113 and connections 112, 117, 122. The queue command information can include an add signal, a frame busy (FBSY) signal, and a delete (del) signal. The add signal is sent when a new frame is within the receive memory 84 of the memory interface system 72 and is ready to be routed through the fiber optic switch 30. When an add signal is sent from the sentry 104 to the scheduler 118, the following information is sent: the add command, the destination port (or queue), a link list tail pointer, a class indicator, the source port, source buffer number, and a link list head pointer.

The FBSY signal is sent when a new frame (returnable) has resided in the receive memory 84 for a predetermined time period (FBSY time period) which is considered too lengthy for the system. The FBSY signal which is sent by the frame time monitoring system 100 to the scheduler 118 generally includes the same information as the add signal, as delineated previously.

The delete signal is sent when a new frame (returnable and nonreturnable) has resided in the receive memory 84 for another predetermined time period (delete time period), which is longer than the FBSY time period, and which warrants deletion of the frame. A delete signal may also be issued for other error conditions. The delete signal which is sent by the frame time monitoring system 100 to the scheduler 118 includes the following path data: (a) the delete command, (b) the source port, and (c) the source buffer number.

D. Frame Time Monitoring System

The frame time monitoring system 100 measures the time in which a new frame resides within the receive memory 84 of a channel module 32. It determines when a delete signal and if and when an FBSY signal should be asserted by the sentry 104. For this purpose, the frame time monitoring system 100 maintains internally a timer for each new frame for tracking the FBSY time period (returnable frames) and the delete time period (returnable and nonreturnable frames pertaining to each new frame.

The frame time monitoring system 100 generally comprises a time processor 100a, preferably a digital signal processor (DSP), which has an on-board (on-chip) memory 109, and a time logic network 100b, in communication with the time processor 100a. The time processor 100a is configured by a time software program 108, which essentially comprises a list of executable instructions, so that a timer is maintained in the memory 109 for each frame to be routed through the switch 30. For initializing the timers, timer timeout values are stored in the memory 109. These timer timeout values set the lengths of the particular frame busy and delete time periods corresponding with a frame.

The time logic network 100b, is situated in the preferred embodiment within the same logic block as the glue logic 113 and is constructed with any suitable logic, for example, FPGA. In general, the time processor 100a maintains and decrements a timer corresponding with each new frame, and the time logic network 100b, interprets and decodes the timer states received from the time processor 100a. With this unique configuration, the time software program 108 driving the time processor 100a can be streamlined so that it can more easily handle numerous timers and with higher precision (update frequency), while the decision making process is handled by the time logic network 100b.

Figure 5:
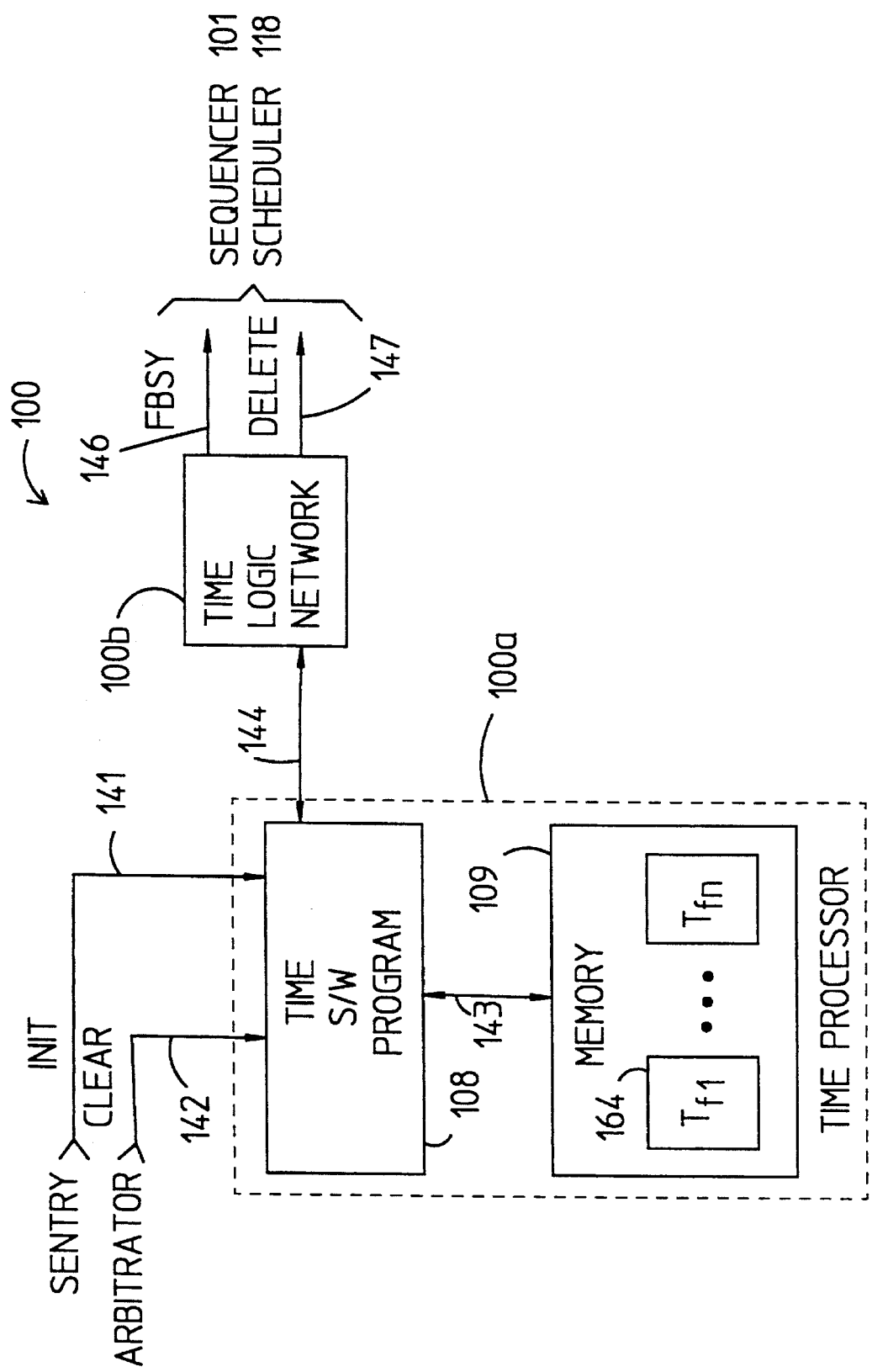
FIG. 5 is a schematic circuit diagram of a high performance frame time monitoring system of the present invention which is situated within the path allocation system of FIGS. 2 and 4.
Figure 6B:
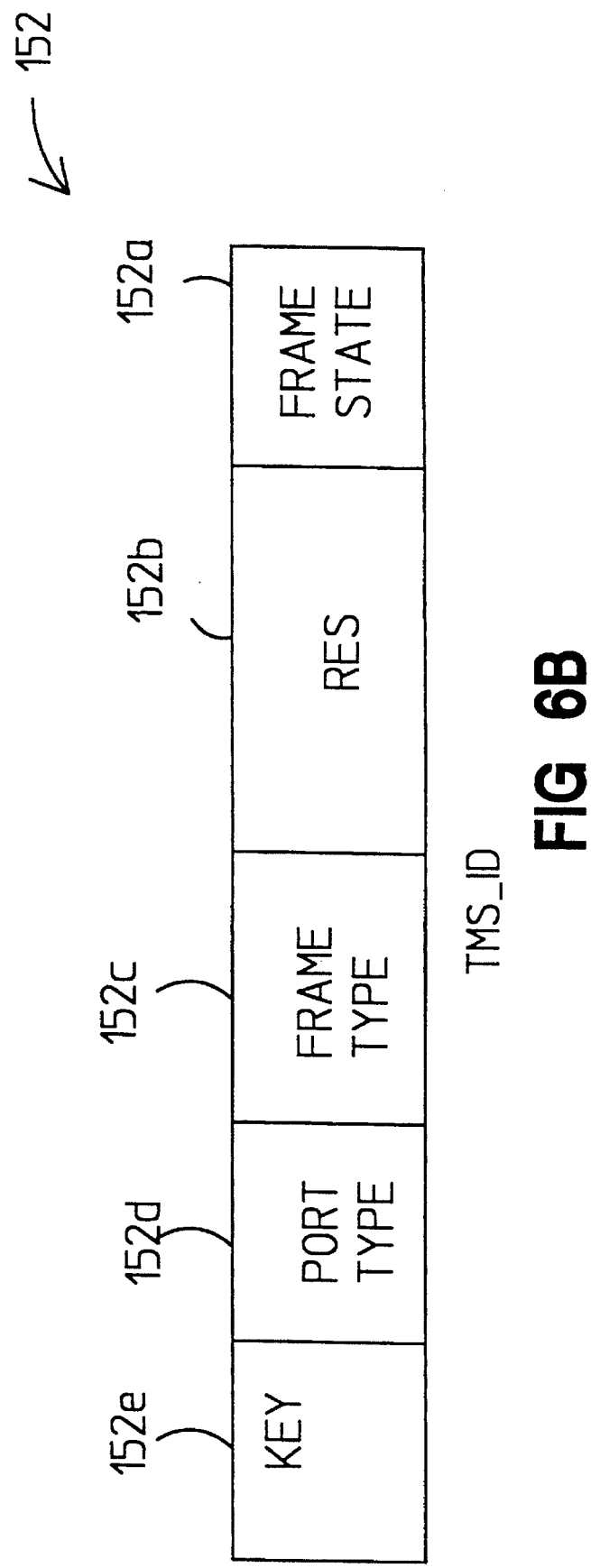
Figure 6C:
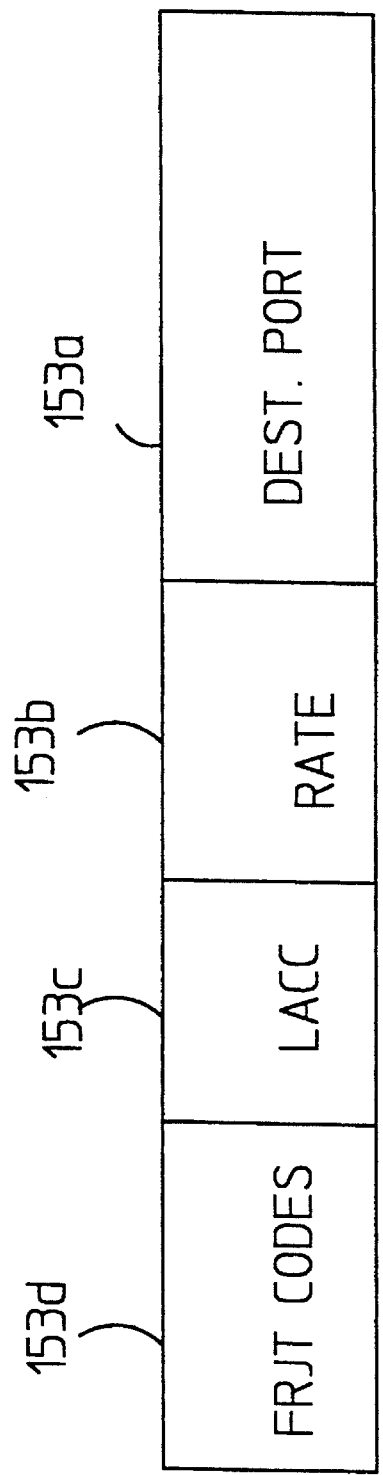

FIG. 5 illustrates more clearly the communication of control signals among the several elements of the frame time monitoring system 100. As shown in FIG. 5, the time software program 108 situated within the time processor 100a receives an initiate (INIT) signal 141 from the sentry 104 on connection 111 (FIG. 4) for starting the timer when a new frame is ready to be received at a port 33. Upon receipt of the initiate signal 141, the time processor 100a reads the following words from the sentry 104: (a) a source port and buffer number identification (SPBN_ID), a timer state identification (TMS_ID), and a frame forwarding identification (FWD_ID). The data structures for the SPBN_ID, TMS_ID, and the FWD_ID are shown in FIGS. 6A, 6B, and 6C, respectively. When the scheduler 121 requests a frame by specifying the SPBN_ID, the time processor 100a passes the TMS_ID and PWD_ID to the scheduler 121 by way of the glue logic 113.

As further shown in FIG. 5, the time software program 108 in the time processor 100a receives a timer clear (CLR) signal 142 from the arbitrator 123 for the purpose of clearing a timer. The timer clear signal is communicated via glue logic 113 (FIG. 4) and via connections 116, 111 (FIG. 4). As indicated by arrow 143 in FIG. 5, the time software program 108 maintains and increments a plurality of timers 164 ($T_{f1}$ ... $T_{fn}$), which correspond respectively with each frame to be routed through the switch 30 (FIG. 2) and which are stored in the on-board memory 109. The time software program 108 communicates timer states corresponding with each timer to the remotely-situated time logic network 100b, as indicated by reference arrow 144. The time logic network 100b, interprets the timer states 144 and can output an FBSY signal 146 and/or a delete signal 147 to the sequencer 101 and scheduler 118 after expiration of, respectively, an PBSY time period and a delete time period, provided that no timer clear signal 142 has been received from the arbitrator 123.

Figure 7:
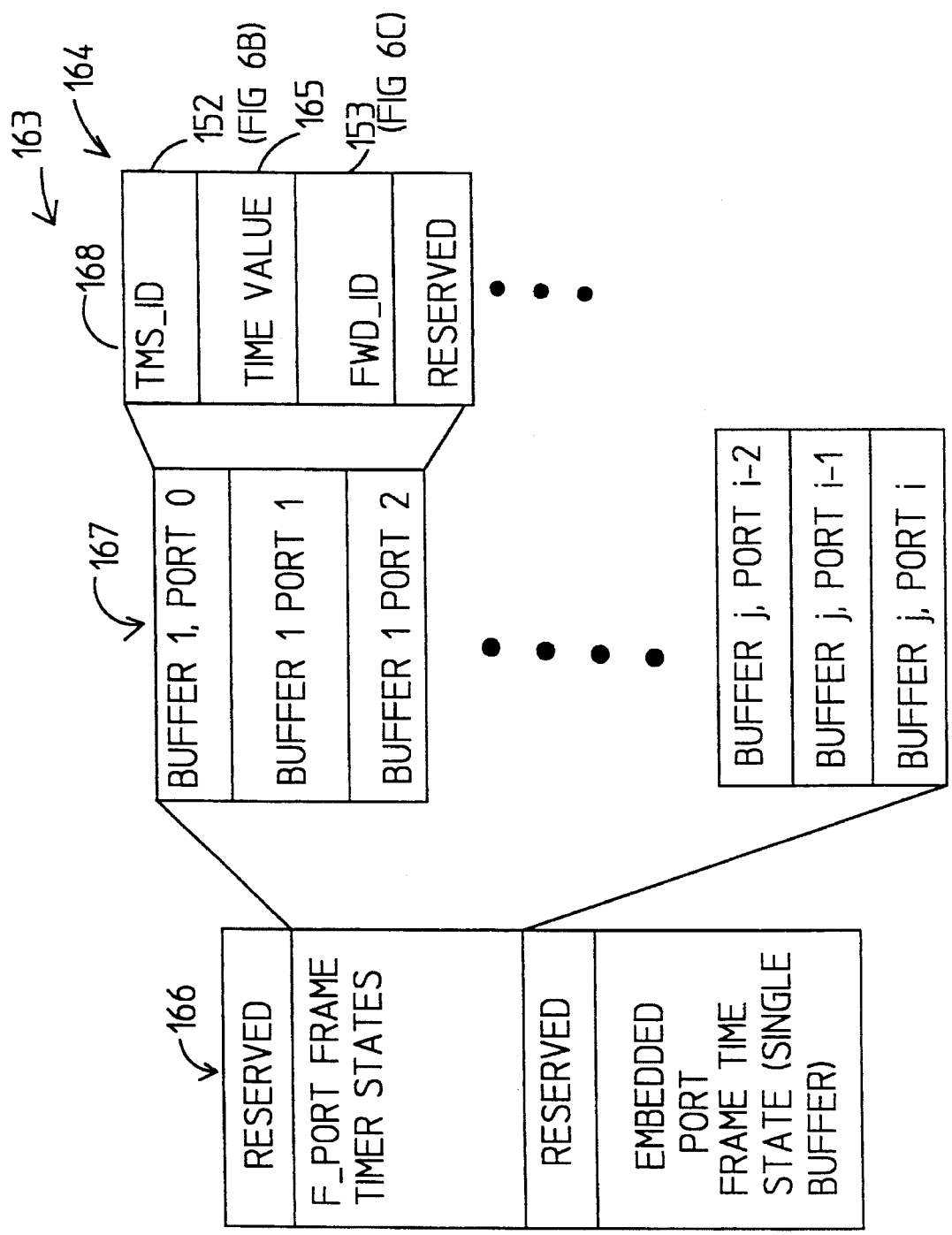
FIG. 7 is a memory map within the on-chip memory of the time processor of FIG. 5 for maintaining timers for each frame.

FIG. 7 shows a preferred memory map 163 for the various timers 164 which are stored in memory 109 of the time processor 100a. The SPBN_ID specifies an address within the memory map 163 of FIG. 7. In the preferred embodiment, up to 241 timers can be set up and maintained simultaneously. Each timer 164 comprises a TMS_ID 152 (FIG. 6B), a time value 165, and an FWD_ID 153 (FIG. 6C). The time value 165 is a binary number which is decremented by one (or by another binary number), eventually to zero, by the time software program 108 in the time processor 100a for the purpose of tracking time. Moreover, the TMS_ID 166 comprises a timer state 152a which indicates the current state of the time value 165. The timer state 152a is used by the time logic network 100b, for determining when the FBSY and delete time periods have expired.

Figure 8:
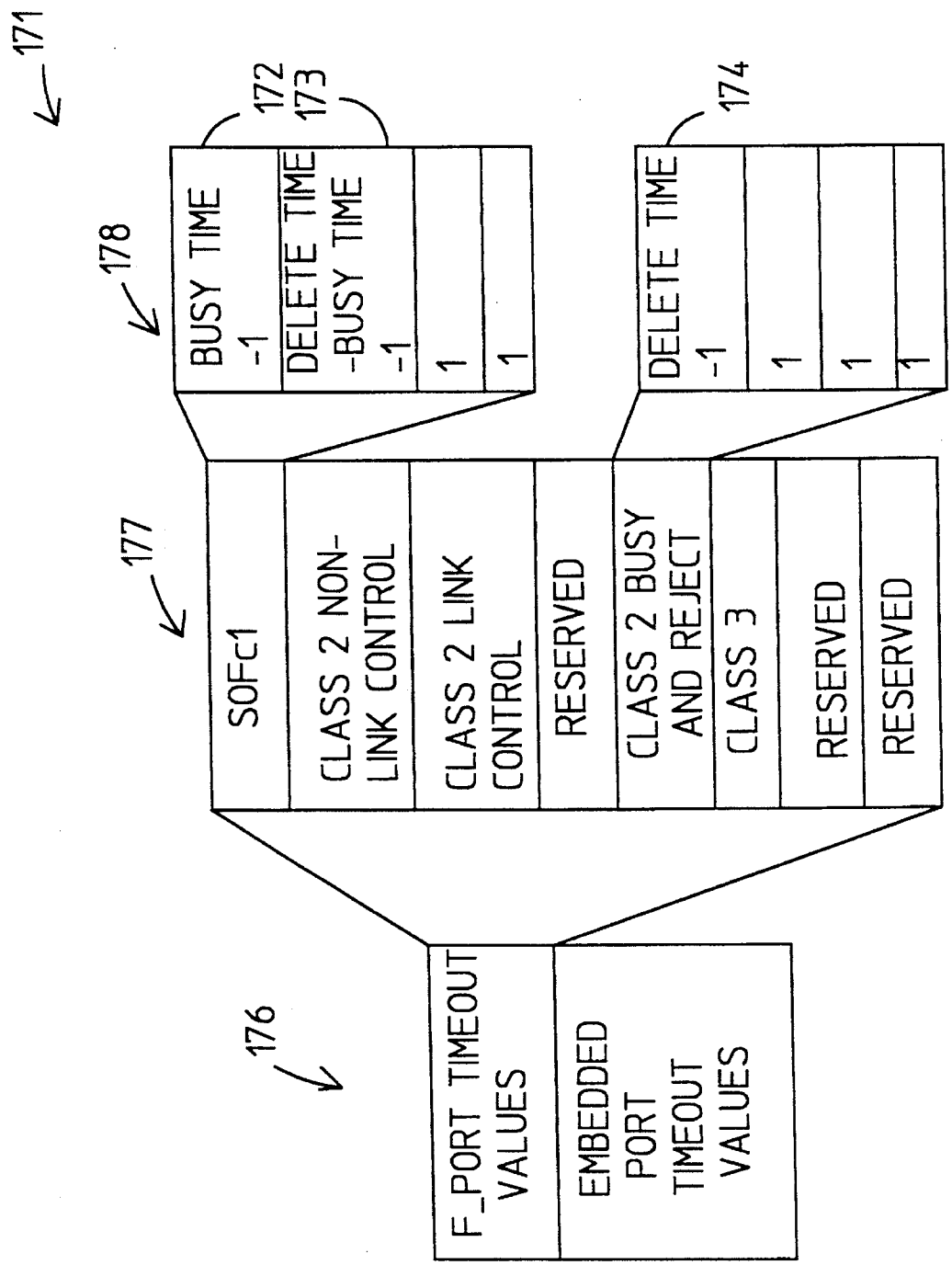
FIG. 8 is a timeout value table for providing time values for the timers maintained in the time processor of FIG. 5.

FIG. 8 illustrates a timeout value table 171 from which delete and FBSY time values are retrieved for operating the timers 164 in FIG. 7. The timeout value table 171 is stored within the memory 109. The TMS_ID specifies an address within the timeout value table 171 of FIG. 8. The time values vary, depending upon the type of frame, as will be further clarified hereafter. The frame type is indicated by reference numeral 177. Moreover, if a frame is returnable, both an FBSY and a delete time value are delineated, and if the frame is nonreturnable, only a delete time value is delineated. More specifically, for returnable frames, for example, an SOFc1 frame as shown in FIG. 8, a time value 172 ("busy time—1"; i.e., binary number corresponding to busy time minus one increment) is provided for the FBSY time period and a time value 173 ("delete time—busy time—1") is provided for the delete time period. For nonreturnable frames, for example, class 2 busy and reject frames (FRJT) as shown in FIG. 8, a time value 174 is provided for only the delete time period.

Table A hereafter indicates which frames are returnable and which frames are nonreturnable. Further, it should be noted that the frame type is delineated in the data pertaining to a new frame, and specifically, in the TMS_ID denoted by reference numeral 152a (in the memory map 163 of FIG. 7).

TABLE A

| FRAME TYPE | RETURNABLE |
| --- | --- |
| SOFcl frames | yes |
| Class 2 non link control frames | yes |
| Class 2 link control frames (excluding FBSY, PBSY, FRJT, PRJT) | yes |
| Class 2 FBSY, PBSY, FRJT, and PRJT | no |
| Class 3 | no |

In Table A, "FBSY" and "FRJT" mean frame busy and frame reject, respectively. They refer to frames from the fabric (from within the switch 30). Further, "PBSY" and "PRJT" mean port busy and port reject, respectively. These frames are received from an N-port (from a port 33) and are introduced into the switch 30. The contents of FBSY, FRJT, PBSY, and PRJT are defined in the ANSI fiber channel standard.

Figure 9:
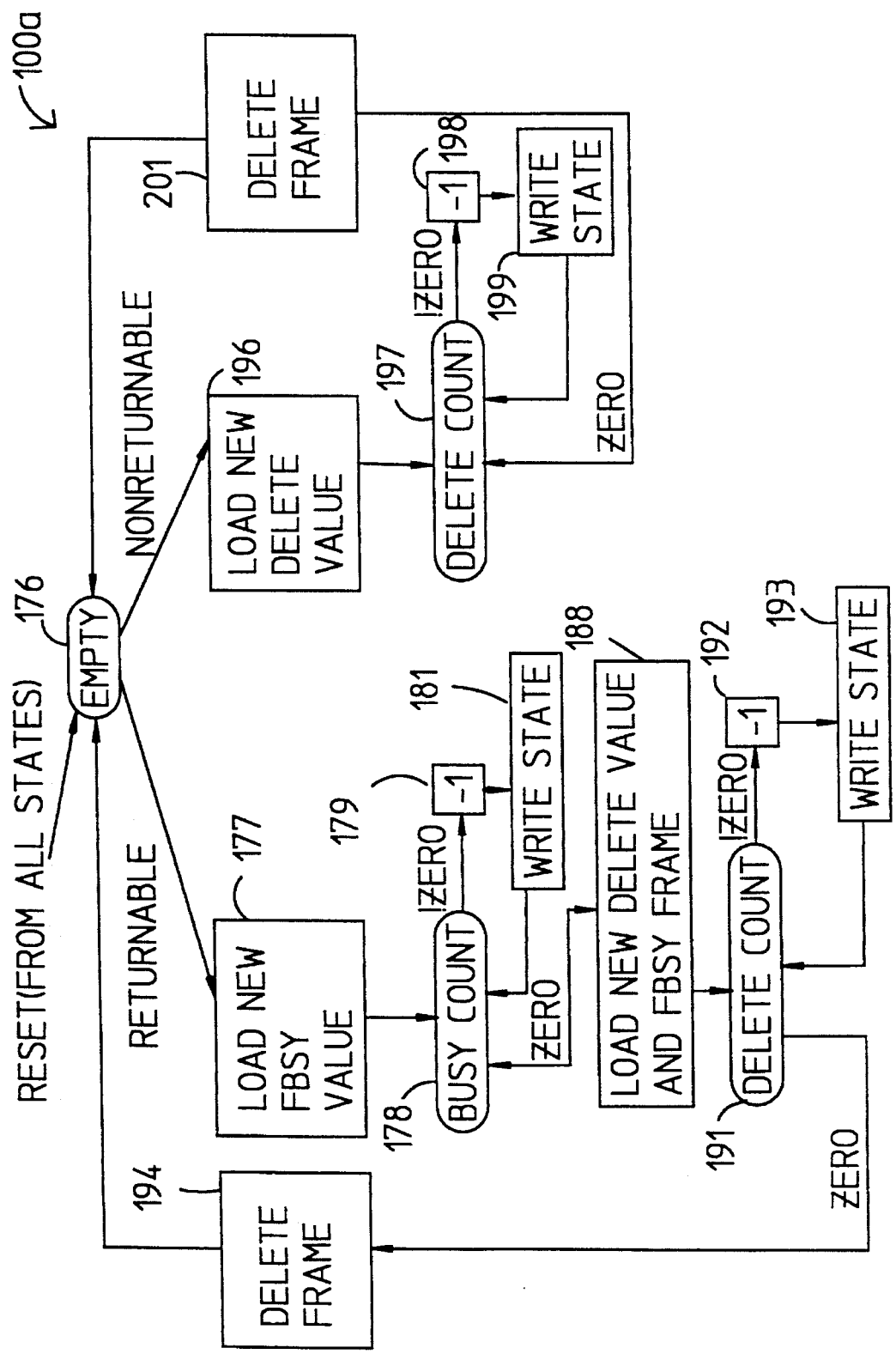
FIG. 9 is a logic block diagram illustrating the architecture and functionality of the time software program driving the time processor in the frame time monitoring system of FIG. 5.

By way of a logic block diagram, FIG. 9 illustrates the architecture and functionality of the logic implemented by the combination of the time software program 108 and the processor 100a. Each logic block in the diagram represents a module in the software of the program 108. While at each logic block, the time software program 108 periodically causes the processor 100a to output from memory 109 the TMS_ID (includes a timer state 152a in FIG. 6B) to the time logic 100b. Tables B and C set forth hereafter indicate the encoding of timer states in the preferred embodiment for returnable and nonreturnable frames, respectively. These tables will be more fully described in relation to the logic block diagram of FIG. 9 hereafter.

TABLE B

| | Returnable Frames |
| --- | --- |
| Timer state | MEANING |
| 0 | New frame |
| 1 | N/A |
| 2 | Count down busy time |
| 3 | Busy timer timeout |
| 4 | Count down difference between busy time and discard time |
| 5 | Discard timer timeout |
| 6 | N/A |
| 7 | N/A |
| 8 | Null |

TABLE C

| | Nonreturnable Frames |
| --- | --- |
| Timer state | Meaning |
| 0 | New Frame |
| 1 | N/A |
| 2 | Count down delete time |

TABLE C-continued

| | Nonreturnable Frames |
| --- | --- |
| Timer state | Meaning |
| 3 | Delete timer timeout |
| 4 | N/A |
| 5 | N/A |
| 6 | N/A |
| 7 | N/A |
| 8 | Null |

With reference to FIG. 9, an empty logic block 176 serves as the starting and reset state of the logic block diagram. The logic block 176 indicates that the particular timer 164 (FIG. 7) does not have a time value 165 (FIG. 7) or has completed a timing experience and is consequently reset. As indicated in Tables B and C, the timer state at this point is state 8. If a frame is returnable, as indicated in Table A hereinbefore, then the logic block 176 transfers to a loop which could initiate both an FBSY signal and a delete signal, if the frame remains in the switch 30 for their corresponding time periods. If the frame is nonreturnable, then the logic block 176 transfers to a loop which can initiate only a delete signal, provided that the frame remains in the switch 30 for the specified time period.

More specifically, when the frame is returnable, the logic block 176 transfers to the logic block 177, where an FBSY time value is loaded into the timer 164 (FIG. 7) at reference numeral 165 (FIG. 7) for the particular frame. The timer state 152a (FIG. 6B) is converted from state 8 to state 0 (Table B). In the preferred embodiment, the TMS_ID defines the memory address for the next FBSY value for loading the timer 164. Moreover, the FBSY time value depends upon the frame type indicated by reference numeral 177 in FIG. 8 (also listed in Table A). The FBSY time values, as well as the delete time values, are set to achieve optimum performance and frame throughput. As an example, link control frames can be set to have a greater FBSY time period and delete time period than nonlink control frames, because this configuration can enhance throughput by freeing up the system. The time software program 108 retrieves the FBSY time value (e.g., 172 in FIG. 8) from the memory 109 (FIG. 5).

Once the timer 164 (FIG. 7) has been loaded with a new time value 165 (FIG. 7) from the timeout value table 163 (FIG. 7), the logic block 177 transfers to a subloop comprising logic blocks 178, 179, 181. While in the subloop, the logic block 179 decrements the time value 165 (FIG. 7) of the timer 164 (FIG. 7) by one increment. One increment can be any number, but in the preferred embodiment, one increment corresponds to about 600 microseconds. After the decrement, the logic block 181 changes the timer state 152a (FIG. 6B) corresponding to the timer 164 from state 0 to state 2 (Table B), which indicates that the time software program 108 (and processor 100a) are now in the process of counting down the busy time period. The timer state 152a, set at state 2, is written to the time logic network 100b, (FIG. 4) situated within the glue logic 113 (FIG. 4). The subloop will continue to decrement the time value 165 and write the timer state 152a to the time logic network 100b, until the time value 165 is decremented to zero ("!zero" means not zero in FIG. 9). When the time value 165 reaches zero, the logic block 178 transfers to the logic block 188.

At logic block 188, the time software program 108 changes the timer state 152a from state 2 to state 3 (Table B). In addition, a new delete time value corresponding to the frame type 152c (FIG. 6B) is retrieved from the timeout value table 171 (FIG. 7). Next, logic block 188 transfers to a subloop comprising logic blocks 191, 192,193. In the subloop, the logic block 192 decrements the delete time value by one increment. The increment can be any number but in the preferred embodiment corresponds to about 600 microseconds. After the decrement, the timer state 4 (Table B) is written to the time logic network 100b, (FIG. 4). The delete time value is decremented until the time value 165 (FIG. 7) reaches zero, in which case logic block 191 transfers to logic block 194.

At logic block 194, the timer state 152a is changed to state 5 (Table B) and the state is written to the time logic network 100b. Finally, after writing the timer state, the logic block 194 transfers back to the empty logic block 176 and the aforementioned process continues.

When a frame is nonreturnable, the logic block 176 transfers to the logic block 196. At logic block 196, the timer state 152a is changed to state 0 (Table C). Moreover, a new delete value corresponding with the new frame is retrieved from the timeout value table 157 (FIG. 7). Next, logic block 196 transfers to a subloop comprising logic blocks 197, 198, and 199. In the subloop, the logic block 198 decrements the delete value by one increment. The increment can correspond to any number, but in the preferred embodiment corresponds to about 600 microseconds in terms of time. After the decrement, the timer state 152a set at state 2 (Table C) is written to the time logic network 100b, as indicated in logic block 199. The subloop continues to decrement the delete value until it reaches zero, in which case the logic block 197 transfers to the logic block 201. At logic block 201, the timer state 152a (FIG. 6B) is changed from state 2 to state 3 (Table C) and the foregoing timer state 152a is written to the time logic network 100b. After the foregoing, logic block 201 transfers to logic block 176 and the aforementioned process continues.

Figure 10:
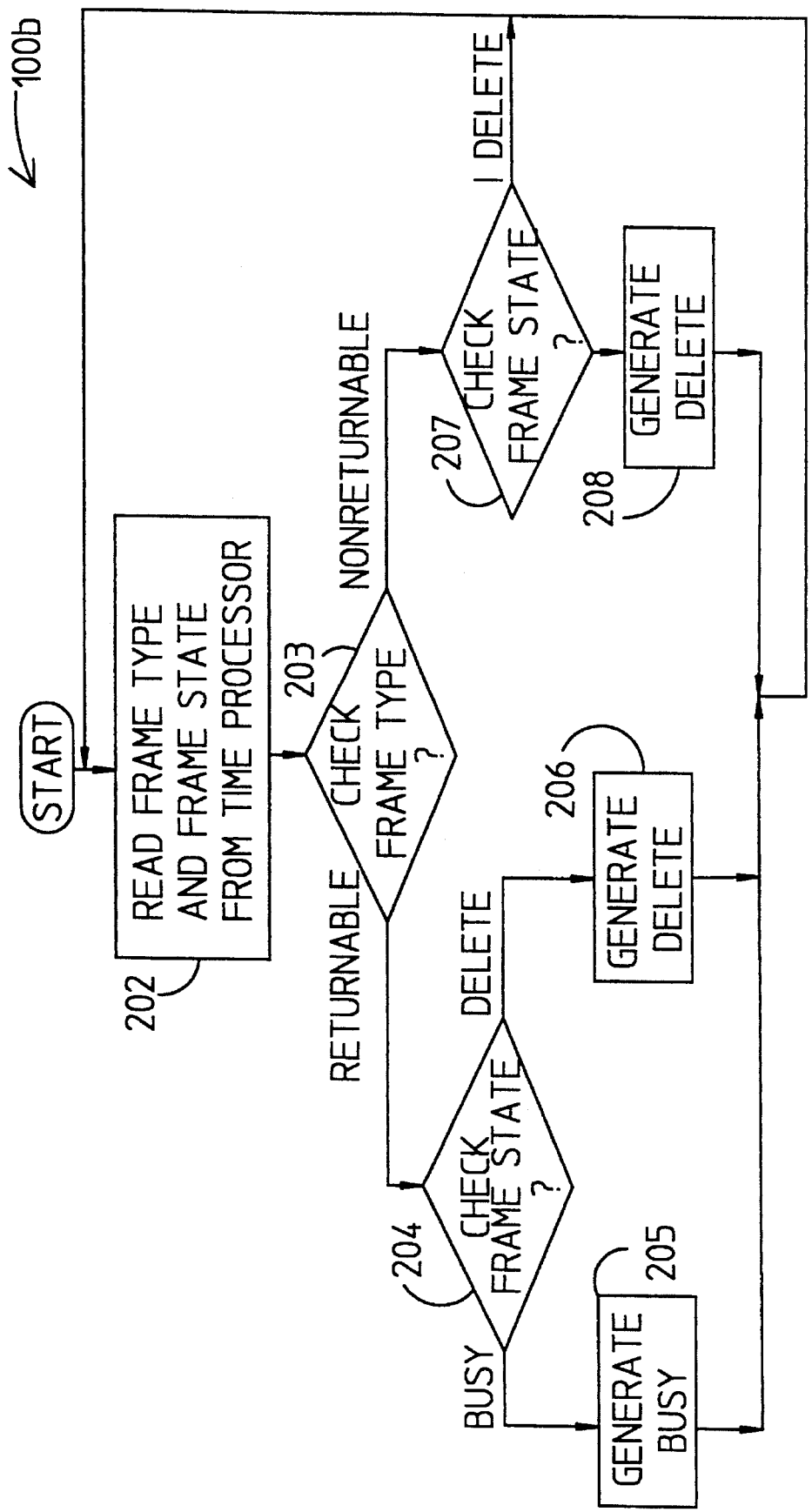
FIG. 10 is a logic block diagram illustrating the architecture and functionality of the time logic network of FIG. 5.

By way of logic block diagram, FIG. 10 illustrates the architecture and functionality of the time logic network 100b, (FIGS. 4, 5). In general, the time logic network 100b monitors the timer states 152a (FIG. 6B) received from the time processor 100a and makes determinations based upon the timer states. Initially, as indicated in logic block 202, the time logic network 100b reads the frame type 174 and the timer state 152a from the TMS_ID (FIG. 9) from the time process 100a. The logic block 202 transfers to the logic block 203, which determines whether the frame is returnable or nonreturnable based upon the frame type 174. When the frame is returnable, the logic block 203 transfers to the logic block 204. At logic block 204, the timer state 152a is examined. When the timer state indicates busy (state 3 in Table B), the logic block 204 transfers to the logic block 205. At logic block 205, an FBSY signal 146 (FIG. 5) is generated. When the timer state indicates delete (state 5 in Table B), then the logic block 204 transfers to the logic block 206, which generates a delete signal 147 (FIG. 5). After logic blocks 205, 206, the aforementioned process repeats.

When the frame is determined to be nonreturnable at logic block 203, then the logic block 203 transfers to the logic block 207. At logic block 207, the timer state 152a is checked to determine whether the frame is to be deleted or not. When the timer state indicates delete (i.e. state 3 in Table C), then the logic block 207 transfers to logic block 208, which generates the delete signal 147 (FIG. 5). After logic block 208, the aforementioned process repeats with the commencement of logic block 202 once again. In the alternative, when the timer state indicates !delete, then block 207 transfers back to logic block 202 and the process repeats.

E. Glue Logic

The glue logic 113 primarily serves as an interface among the sentry 104, the frame time monitoring system 100, the sequencer 101, the arbitrator 123, and the scheduler 118. In the preferred embodiment, the glue logic 113 is implemented as a state machine(s) via a commercially available FPGA or other suitable logic. The glue logic 113 also performs other functionality in the preferred embodiment. The glue logic 113 monitors transmission ready (txready) signals and intermix ready signals through the sequencer 101, which indicate when a port intelligence mechanism 73 is ready to receive a data frame. The glue logic 113 performs a circular sequence wherein it searches in sequence through those txready signals and intermix ready signals which are asserted, by masking out those which are deasserted, to determine the next destination port 33 which is to receive data (as well as the next destination queue 121 to service). The glue logic 113 forwards the identity of the next destination port 33 to be serviced to the scheduler 118 via connections 117, 122. In this regard, the glue logic 113 forwards a word to the scheduler 118 comprising a base pointer address, which identifies the heads of double link list queues, and a destination queue indicator, which identifies a particular destination queue.

F. Scheduler

The scheduler 118, which can be implemented with any convention processing mechanism, such as a DSP, maintains and manages the destination queues ($Q_{p1}$–$Q_{pi}$) 121 and receives the queue management commands, particularly, an add signal, an FBSY signal, and a delete signal, from the sentry 104. The scheduler 118 also receives a next destination port signal via connections 117, 122, from the glue logic 113. The next destination port signal indicates the next port 33 to service (and hence, the next destination queue 121 to service).

The scheduler 118 maintains and updates a destination queue ($Q_{p1}$–$Q_{pi}$) 121 for each of the fiber optic ports (p1–pi) 33 and is configured to store queue entries associated with each corresponding port 33. Each queue entry has path data which identifies the following: (a) source port 33 from which data is to be transferred from, (b) the source buffer number in receive memory 84 where the frame is located, and (c) flags which indicate whether the queue entry is a normal frame entry, a frame for starting a class 1 data transfer ("SOFc1") entry, a Q-Head entry, or a Q-tail entry. Each of the queue entries is related by a link list, preferably a double or multiple link list, wherein each queue entry is associated with a backward link for designating a previous queue entry (via previous source port and buffer number) and a forward link for designating a subsequent queue entry (via next source port and buffer number). The double link lists provide an easy way to construct and manipulate queues, while minimizing hardware requirements.

When the scheduler 118 receives path data pertaining to a new frame from a port intelligence mechanism 73 via an add signal from the sentry 104, the scheduler 118 stores the path data in an appropriate destination queue 121, along with a forward and backward link.

When the scheduler 118 writes out data from the queues 121, it does so in an order defined by the glue logic 113. Moreover, when the scheduler 118 writes out path data from a particular destination queue 121, the scheduler 118 retrieves the queue entries from the destination queue 121 in an order defined by the link list associated therewith and then sends a request to transfer the new frame between the source port 33 and the destination port 33 to the arbitrator 123, which in turn causes the switch module 36 to interconnect the appropriate data path via the MDN 42 if the involved ports are ready.

When the scheduler 118 receives an FBSY signal corresponding to a frame from the sentry 104, the scheduler 118 takes the queue entry associated with the FBSY signal and moves the queue entry to the destination queue 121 corresponding to the source port 33 where the data frame originated, so that the data frame is eventually returned to the port 33 from which it came.

When the scheduler 118 receives a delete signal corresponding to a frame, the scheduler 118 will delete the queue entry associated with the frame. Note that the frame which is deleted was previously put into the queue corresponding to the source port 33 where the frame originated by virtue of the FBSY signal from the sentry 104.

G. Arbitrator

The arbitrator 123 is implemented with any suitable logic, preferably with a state machine(s) implemented in a commercially available FPGA. The arbitrator 123 tracks the status of the port intelligence mechanisms 73, determines when the port intelligence mechanisms 73 are available and unavailable for transmitting and receiving data, and arbitrates connections between the port intelligence mechanisms 73. Specifically, the arbitrator 123 monitors transmission ready (txready), intermix ready, intermix bus ready, and receive ready (rxready) signals generated by the status/control logic 85 (FIG. 3) of the port intelligence mechanisms 73. When the arbitrator 123 receives a transfer request signal from the scheduler 118 to transfer data from a particular source port 33 to a particular destination port 33, the arbitrator 123 determines whether the transfer is either class 1 (circuit switching) or class 2 (frame switching).

If a class 1 transfer is to be effectuated, then the arbitrator 123 determines if both the particular source port 33 and the destination port 33 are available for both transmitting and receiving data, because a class 1 transfer is bidirectional and requires a reserved data path through the switch 30. If a class 2, 3 transfer is to be effectuated, then the arbitrator 123 determines whether the particular source port 33 is ready to transfer and whether the particular destination port 33 is available for receiving a data frame.

When the ports 33 are not ready to make the transfer (class 1, 2, 3), then the arbitrator 123 refuses the scheduler's transfer request, and the scheduler 118 revisits the transfer request later using any suitable algorithm, until the transfer request is ultimately granted. Once a transfer request has been granted by the arbitrator 123, the arbitrator 123 controls the MDN 42 (FIG. 2) so that the MDN 42 connects the appropriate source port 33 to the appropriate destination port 33. Moreover, after or when the data transfer has been authorized by the arbitrator, the arbitrator 123 forwards a scheduler clear signal to the scheduler 118 so that the scheduler 118 eliminates the associated queue entry from the corresponding link list queue. The arbitrator 123 also forwards a timer clear signal to the frame time monitoring system 100 in order to clear the timer's internal FBSY/del clock for the data frame being transferred.

H. Closer

The closer 128 is implemented with any suitable logic, but preferably with a state machine(s) implemented in a commercially available FPGA. The closer 128 monitors the transfer status ready signals (xfer ready; indicates when status information is ready and not ready to be transferred) corresponding with the ports 33 via connection 131 to the CDN 43. The closer 128 interfaces to the sequencer 101 in order to execute CDN switch commands and to execute destination port commands for a collection of status information. The closer 128 further collects frame statistics and delivers an increment count command to the EC interface 133. The statistics and increment count can be used by high level optimization algorithms to optimize network performance and network management.

The EC interface 133 is implemented with any conventional processing mechanism, such as a DSP. It interfaces the path allocation system 51 to the element controller 58 (FIG. 2) via a serial connection 135. The EC interface 133 accepts commands from the element controller 58, builds packets from the commands, maintains and accesses the path allocation system's memory to execute read or write commands from the element controller 58, sends commands to the sentry 104 in order to change address validation table information, and sends commands to the frame time monitoring system 100 through the dedicated serial port 135.

IV. Operation

The overall operation of the fiber optic switch 30 with the novel path allocation system 51 will now be described with reference to FIGS. 1 through 4 and, particularly, to a class 2 data transfer where a new data frame is routed through the fiber optic switch 30 and to a class 1 data transfer where a bidirectional reserved data path is established between ports Initially, a data frame is forwarded to the receive memory 84 of a channel module 32 from a source port (p1–pi) 33. The status/control logic 85 associated with the source port 33 outputs an rxready signal to the status MUX 41, which forwards the rxready signal to the sentry 104. Based upon the rxready signal, the sentry 104 recognizes that a new frame is available and asks the sequencer 101 to request path data from the status/control logic 85 associated with the source port 33 from which the new frame was received. The path data includes a source identification (SID), a buffer number indicating the location of the frame in receive memory 84, a destination port identification (DID), and a class indicator (class 1 or 2).

In this regard, the sequencer 101 communicates a sequence of control commands to the CDN 43 in order to set up the CDN for causing the status/control logic 85 associated with the source port 33 to forward the path data corresponding to the new frame. The CDN 43 then causes the path data for the new frame to be transferred from the status/control logic 85 to the sentry 104. The sentry 104 validates the SID and maps the DID to a specific destination port 33. If either the DID or SID is invalid, a reject frame signal is queued in the status/control logic 85 instead of the frame itself.

The sentry 104 informs both the frame time monitoring system 100 and the scheduler 118 of the presence of the new frame. The timer initiates the FBSY/del clock. Moreover, the sentry 104 sends an add signal to the scheduler 118. The scheduler 118 determines which destination queue to utilize based on the destination port indicator associated with the add signal from the sentry 104. A tail base pointer address in the add signal is utilized for accessing the tail of the particular destination queue, which is where the path data corresponding to the new frame is added. The scheduler 118 uses the source port indicator, the source buffer number (in a receive memory 84), and class indicator to generate a queue entry in the particular destination queue, which is placed at the tail of the particular destination queue 121.

In the event that the FBSY time period expires at the frame time monitoring system 100 before the frame time monitoring system 100 receives the timer clear signal from the arbitrator 123, the frame time monitoring system 100 will forward an FBSY signal to the glue logic 113, which in turn will send an FBSY signal to the scheduler 118. At this point, the scheduler 118 takes the queue entry associated with the FBSY signal and moves the queue entry to the queue corresponding to the source port 33 where the data originated, so that the data is eventually returned to the source port 33 from which it came.

If the predetermined delete time period expires at the frame time monitoring system 100 prior to the time that the frame time monitoring system 100 receives the timer clear signal from the arbitrator 123, then the frame time monitoring system 100 will forward a delete signal to the glue logic 113, which in turn will forward a delete signal to the scheduler 118. At this point, the scheduler 118 will delete the queue entry associated with the expired delete time period (which was previously put in the queue 121 corresponding to the source port 33 of origination).

As queue entries are introduced into the queues 121 by the scheduler 118, the scheduler 118 is also concurrently routing transfer requests to the arbitrator 123 for particular data connections and destination ports 33. The scheduler 118 receives a next destination port signal from the glue logic 113, and accordingly, the scheduler 118 retrieves the queue entry at the head of the queue corresponding to the next destination port 33. The scheduler 118 then sends a transfer request to the arbitrator 123 corresponding to the retrieved queue entry.

The arbitrator 123 continuously monitors the status signals (e.g., rxready, intermix ready, intermix bus ready, txready) from the source and destination port intelligence mechanisms 73 and determines whether the particular source and destination ports 33 are ready to exchange data. The arbitrator 123 determines whether the transfer is either class 1 or class 2. If class 1, then the arbitrator 123 determines if both the particular source port 33 and the destination port 33 are available for both transmitting and receiving data, because a class 1 transfer requires a reserved path. If class 2, then the arbitrator 123 determines whether the particular source port 33 is ready to transfer (i.e., rxready for source port 33 is asserted) and whether the particular destination port 33 is available for receiving the new frame (i.e., txready for the destination port 33 is asserted).

When the ports 33 are not ready to make the frame transfer, then the arbitrator 123 refuses the scheduler's transfer request, and the scheduler 118 revisits the transfer request later, until the transfer request is ultimately granted.

Once a class 1 transfer request has been granted by the arbitrator 123, the arbitrator 123 configures the MDN 42 so that the MDN 42 reserves a data path and connects the appropriate source port 33 to the appropriate destination port 33. Moreover, once a class 2 transfer request has been granted by the arbitrator 123, the arbitrator 123 configures the MIDN 42 or the IDN 44 so that the new data frame is channeled from the receive memory 84 associated with the source port 33 to the appropriate destination port 33.

Upon the granting of a data transfer, the sequencer 101 informs the particular status/control mechanism 85 corresponding to the destination port 33 to expect data so that the mechanism 85 can set up accordingly. The arbitrator 123 also forwards a scheduler clear signal to the scheduler 118 so that the scheduler 118 eliminates the associated queue entry from the corresponding destination queue, and also forwards a timer clear signal to the frame time monitoring system 100 to clear the timer's internal FBSY/del clock corresponding to the frame. Moreover, after the frame time monitoring system 100 clears its clock, the sequencer 103 forwards a control signal to the status/control logic 85 associated with the source port 33 to ultimately cause the receive memory 84 to forward the new frame (or perhaps a frame rejection signal) to the switch module 36 and then the destination port 33.

The closer 128 finishes the frame transfer by insuring that the transfer has occurred and by collecting the statistics on the transfer. The closer 128 requests the transfer status through the sequencer 101 regarding the transfer of the frame through the sequencer 101. In turn, the destination port intelligence mechanism 73 advises the closer 128 of the status. The status information can include at least the following: CRC error, null frame, FBSY, reject frame (bad SID or DID), SOFc1, intermix, and source port number. The closer 128 then instructs the EC interface 133 to increment a count, and the EC interface 133 increments the appropriate count.

It will be obvious to those skilled in the art that many variations and modifications may be made to the preferred embodiment of the frame time monitoring system 100 and associated methodology as well as the fiber optic switch 30 without substantially departing from the principles of the present invention. All such variations and modifications are intended to be included herein within the scope of the present invention, as set forth in the following claims.

Wherefore, the following is claimed:

1. A frame time monitoring system for tracking with high performance the time in which data frames reside within a fiber optic switch for a fiber optic network, the network switch for transferring the data frames from source ports to destination ports, comprising:

a processor configured to implement a timer relative to an incoming frame upon notification of receipt of said frame by a source port, said processor configured to output sequential timer states; and a logic network connected to said processor to receive said timer states, said logic network comprising a delete means for determining elapse of a predetermined delete time period based upon said timer states, said delete means for generating a delete signal after said elapse of said predetermined delete time period;

whereby high performance is achieved by utilizing said processor as a timing incrementer and by allocating logical decisions to said logic network which is faster than said processor.

2. The system of claim 1, wherein said logic network further comprises:

frame return determination means for determining when said frame is returnable and nonreturnable to said source port; and frame busy means for determining elapse of a predetermined frame busy time period based upon said timer states when said frame is returnable, said frame busy means for generating a frame busy signal after said elapse of said frame busy time period.

3. The system of claim 1, wherein said processor is a digital signal processor.

4. The system of claim 1, wherein said logic network is implemented in hardware with an integrated circuit and wherein said timer is implemented in software within said processor.

5. A frame time monitoring system for tracking with high performance the time in which data frames reside within a fiber optic switch for a fiber optic network, the network switch for transferring the data frames from source to destination fiber optic channels, comprising:

(a) a plurality of ports corresponding respectively with said channels;

(b) a memory means associated with said ports, said memory means for temporarily storing an incoming new data frame from a source port;

(c) a distribution network configured to interconnect said ports;

(d) a sentry in communication with said memory means, said sentry configured to determine when said new data frame has been received by said memory means;

(e) a scheduler which maintains a destination queue corresponding with each of said ports, said scheduler configured to receive path data pertaining to said new data frame from said sentry after said sentry determines receipt of said new data frame, said path data including a source port indicator, a memory address identifying a location of said frame in said memory means, and a destination port indicator, and said scheduler configured to place said path data within a destination queue corresponding with said destination port and to retrieve said path data from said destination queue based upon an order defined by said queue;

(f) an arbitrator configured to control said distribution network and to communicate with said scheduler, said arbitrator configured to determine, after said arbitrator receives a frame transfer request from said scheduler, when said destination port is busy servicing another frame transfer request and when said destination port is available for accommodating said frame transfer request, and said arbitrator configured to allow communication of said new data frame to said destination port via said distribution network when said destination port is available and to disallow said frame transfer request when said destination port is busy; and (g) a frame time monitoring mechanism configured to track time associated with said new data frame, said frame time monitoring mechanism having:

(1) a processor configured to implement a timer relative to said new data frame, said timer being initiated by said sentry when said new data frame is determined to exist within said memory means, said processor configured to output timer states, said timer being cleared via a clear signal from said arbitrator when said frame transfer request corresponding to said new data frame is allowed; and (2) a logic network connected to said processor to receive said timer states, said logic network for communicating a delete signal to said scheduler after a predetermined delete time period unless said clear signal is received from said arbitrator.

6. The system of claim 5, wherein said frame time monitoring mechanism further comprises:

frame return determination means for determining when said frame is returnable and nonreturnable to said source port; and frame busy means for determining elapse of a predetermined frame busy time period based upon said timer states when said frame is returnable, said frame busy means for generating a frame busy signal after said elapse of said frame busy time period.

7. A frame time monitoring method for tracking with high performance the time in which data frames reside within a fiber optic switch for a fiber optic network, the switch for transferring the data frames from source ports to destination ports, comprising the steps of:

(a) implementing a timer in software with a processor;

(b) commencing said timer after receipt of a frame; and (c) passing timer states from said timer to a logic network in hardware, said logic network performing the following steps:

(1) determining elapse of a predetermined delete time period based upon said timer states; and (2) generating a delete signal after said elapse of said predetermined delete time period.

8. The method of claim 7, wherein said logic network as recited in step (c) further performs the following steps:

(3) determining when said frame is returnable and nonreturnable to said source port; and (4) determining elapse of a predetermined frame busy time period based upon said timer states when said frame is returnable, and when said frame is returnable, generating a frame busy signal after said elapse of said frame busy time period.

9. The method of claim 7, further comprising the steps of:

determining a frame type corresponding with said frame;

retrieving a time value corresponding with said frame type;

decrementing said time value; and generating said timer states based upon a status of said time value.

10. The method of claim 7, further comprising the step of specifying a plurality of delete time periods corresponding with different frame types.

11. The method of claim 7, further comprising the step of specifying a plurality of delete time periods corresponding with different port types.

12. The method of claim 8, further comprising the step of specifying a plurality of frame busy time periods and a plurality of delete time periods corresponding with different frame types.

13. The method of claim 8, further comprising the step of specifying a plurality of frame busy time periods and a plurality of delete time periods corresponding with different port types.

14. The method of claim 8, further comprising the step of generating a frame rate signal to accompany said frame busy signal so that said frame can be returned at a particular frame rate.

15. The method of claim 8, further comprising the step of using said timer states to define respective memory addresses for values for loading said timer.

16. The method of claim 10, further comprising the step of specifying longer delete time periods for link control frames than for nonlink control frames.

* * * * *